US 8,978,062 B2

(12) United States Patent
Loebig et al.

(10) Patent No.: US 8,978,062 B2
(45) Date of Patent: Mar. 10, 2015

(54) APPARATUS AND METHOD FOR PROCESSING AUDIO AND/OR VIDEO DATA

(75) Inventors: Norbert Loebig, Darmstadt (DE); Helmut Richter, Freising (DE); Armin Wilke, Ampfing (DE)

(73) Assignee: Nokia Siemens Networks GmbH & Co., Munich (DE)

( * ) Notice: Subject to any disclaimer, the term of this patent is extended or adjusted under 35 U.S.C. 154(b) by 1153 days.

(21) Appl. No.: 12/522,277

(22) PCT Filed: Oct. 26, 2007

(86) PCT No.: PCT/EP2007/061546
§ 371 (c)(1),
(2), (4) Date: Jan. 22, 2010

(87) PCT Pub. No.: WO2008/083868
PCT Pub. Date: Jul. 17, 2008

(65) Prior Publication Data
US 2010/0175088 A1    Jul. 8, 2010

Related U.S. Application Data

(60) Provisional application No. 60/884,751, filed on Jan. 12, 2007.

(51) Int. Cl.
*G06F 3/00*     (2006.01)
*G06F 13/00*    (2006.01)
(Continued)

(52) U.S. Cl.
CPC ............ *H04N 5/44513* (2013.01); *G11B 27/34* (2013.01); *H04N 5/76* (2013.01); *H04N 5/765* (2013.01); *H04N 5/775* (2013.01); *H04N 5/781* (2013.01); *H04N 5/783* (2013.01); *H04N 5/85* (2013.01); *H04N 5/907* (2013.01); *H04N 21/488* (2013.01); *H04N 21/4312* (2013.01); *H04N 21/4331* (2013.01); *H04N 21/4334* (2013.01); *H04N 21/44222* (2013.01);
(Continued)

(58) Field of Classification Search
None
See application file for complete search history.

(56) References Cited

U.S. PATENT DOCUMENTS 5,563,859 A    10/1996  Masuda
5,655,144 A     8/1997  Milne
(Continued)

FOREIGN PATENT DOCUMENTS

EP      1037461         9/2000
WO    WO2005/119682    12/2005
WO    WO2006/040729     4/2006

OTHER PUBLICATIONS

Pinnacle Systems, inc., "Studio Version 8 User Guide", 2002, 267 page(s), 2002 by Pinnacle Systems, Inc.
(Continued)

*Primary Examiner* — Nasser Goodarzi
*Assistant Examiner* — Fred Peng
(74) *Attorney, Agent, or Firm* — Michael Haynes PLC; Michael N. Haynes

(57) ABSTRACT

An apparatus and a method are provided for processing audio and/or video data comprising a module for displaying an element comprising at least one absolute time or at least one time indicator, wherein a sector or portion associated with the element indicates a duration or a length of the audio and/or video data, wherein time marks are displayed that are set automatically or by user interaction.

31 Claims, 16 Drawing Sheets

(51) Int. Cl.
*H04N 5/445* (2011.01)
*G11B 27/34* (2006.01)
*H04N 5/76* (2006.01)
*H04N 21/488* (2011.01)
*H04N 21/431* (2011.01)
*H04N 21/433* (2011.01)
*H04N 21/472* (2011.01)
*H04N 21/4728* (2011.01)
*H04N 21/845* (2011.01)
H04N 5/765 (2006.01)
H04N 5/775 (2006.01)
H04N 5/781 (2006.01)
H04N 5/783 (2006.01)
H04N 5/85 (2006.01)
H04N 5/907 (2006.01)
H04N 21/442 (2011.01)

(52) U.S. Cl.
CPC .... *H04N 21/4424* (2013.01); *H04N 21/47214* (2013.01); *H04N 21/47217* (2013.01); *H04N 21/4728* (2013.01); *H04N 21/8455* (2013.01)
USPC ............... 725/37; 725/38; 725/39; 725/40

(56) References Cited

U.S. PATENT DOCUMENTS

| | | | |
|---|---|---|---|
| 5,701,383 A | 12/1997 | Russo | |
| 5,717,869 A | 2/1998 | Moran | |
| 5,754,508 A | 5/1998 | Hosoda | |
| 5,786,814 A | 7/1998 | Moran | |
| 5,793,880 A | 8/1998 | Constant | |
| 5,986,655 A | 11/1999 | Chiu | |
| 6,137,943 A | 10/2000 | Kanda | |
| 6,266,295 B1 | 7/2001 | Parker | |
| 6,593,942 B1 | 7/2003 | Bushmitch | |
| D480,092 S | 9/2003 | Kreikemeier | |
| 6,847,778 B1 | 1/2005 | Vallone | |
| 7,386,220 B2 | 6/2008 | Kim | |
| 7,394,725 B2 | 7/2008 | Bloch | |
| 7,590,553 B2 | 9/2009 | Coates | |
| 7,907,476 B2 | 3/2011 | Lee | |
| 2002/0040475 A1 | 4/2002 | Yap | |
| 2002/0054066 A1 | 5/2002 | Kikinis | |
| 2002/0054750 A1 | 5/2002 | Ficco | |
| 2003/0237090 A1 | 12/2003 | Boston | |
| 2004/0091249 A1 | 5/2004 | Mekenkamp | |
| 2004/0128317 A1 | 7/2004 | Sull | |
| 2004/0225966 A1* | 11/2004 | Besharat et al. | 715/705 |
| 2005/0091096 A1 | 4/2005 | Coates | |
| 2005/0108305 A1 | 5/2005 | Lou | |
| 2005/0138658 A1* | 6/2005 | Bryan | 725/46 |
| 2005/0243655 A1 | 11/2005 | McCutcheon | |
| 2005/0257152 A1 | 11/2005 | Shimizu | |
| 2006/0036960 A1 | 2/2006 | Loui | |
| 2006/0156287 A1 | 7/2006 | Vikram | |
| 2006/0171453 A1 | 8/2006 | Rohlfing | |
| 2006/0236342 A1* | 10/2006 | Kunkel et al. | 725/52 |
| 2006/0267967 A1 | 11/2006 | Hinckley | |
| 2006/0277454 A1 | 12/2006 | Chen | |
| 2007/0070822 A1* | 3/2007 | Booty et al. | 368/223 |
| 2007/0139805 A1 | 6/2007 | Mead | |
| 2007/0233726 A1 | 10/2007 | Torrens | |
| 2007/0250772 A1* | 10/2007 | Milosevski | 715/716 |
| 2008/0084397 A1 | 4/2008 | On | |
| 2008/0089671 A1 | 4/2008 | Lang | |
| 2008/0209468 A1* | 8/2008 | Milosevski | 725/39 |
| 2009/0113478 A1* | 4/2009 | Haughawout et al. | 725/40 |
| 2009/0172543 A1 | 7/2009 | Cronin | |

OTHER PUBLICATIONS

Shrivastava, "Analyzing Disk Space", Jul. 27, 2006, 7 page(s), http://raviratlami1.blogspot.com/2006/07/analyzing-diskspace.html.

Torrrens, "Visualizing and Exploring Personal Music Libraries", Oct. 4, 2004, 4 page(s), http://ismir2004.ismir.net/proceedings/p076-page-421-paper214.pdf.

* cited by examiner

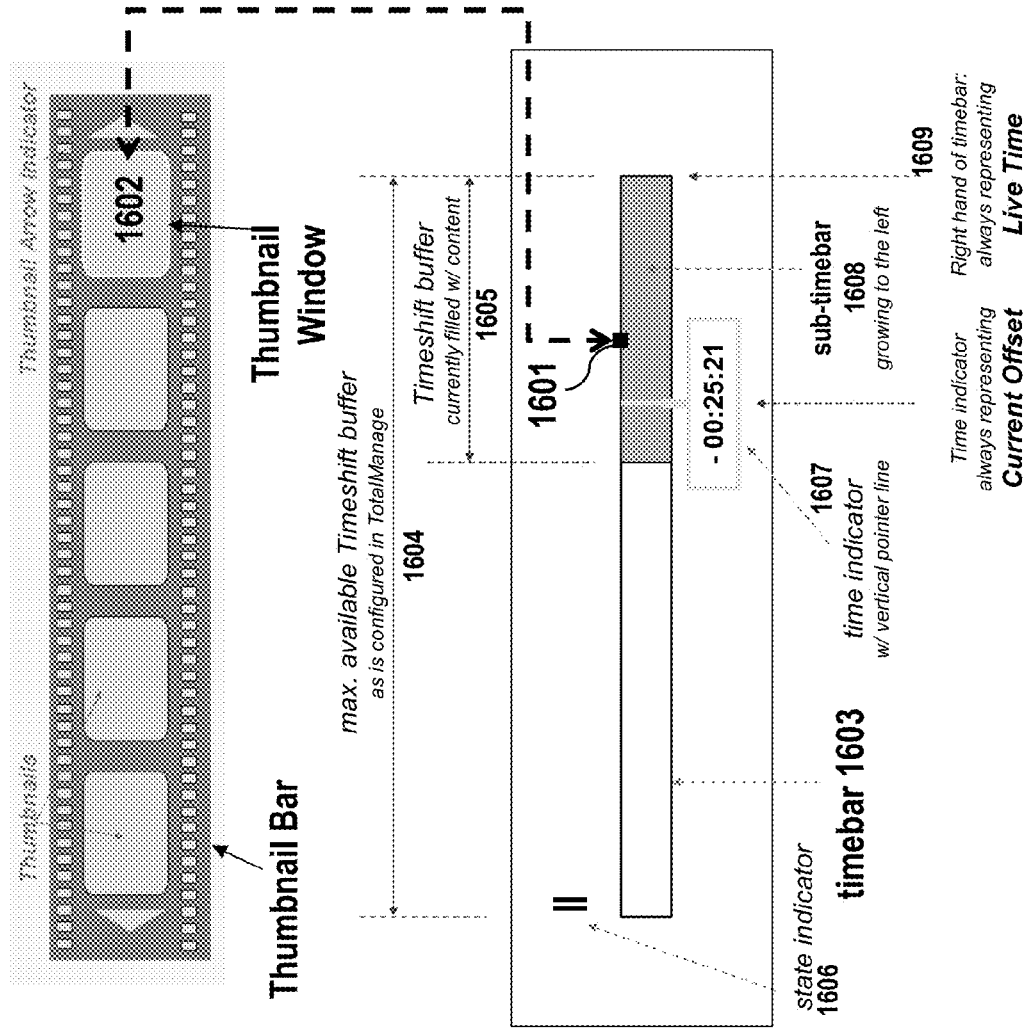

APPARATUS AND METHOD FOR PROCESSING AUDIO AND/OR VIDEO DATA

The invention relates to an apparatus and to a method for processing audio and/or video data.

Multimedia devices such as digital or analog video recorders allow to store a program that is broadcasted via cable or satellite on, e.g., a video cassette or a hard disc, according to specific parameters (e.g. program, start time, stop time, repetition, etc.) set by a user.

Such recording function may also be provided by a set top box (STB).

Current recording devices allow to freely record a program while a user is watching this particular (or another) program. Hence, the user is able to repeatedly watch a particular scene (or the whole show or movie) or s/he may decide to archive it afterwards.

This leads in particular to problems regarding an efficient administration of (partially) recorded material.

The problem to be solved is to provide an efficient approach to utilize and/or to administer stored material and to thereby in particular allow an improved and efficient handling of such data to a user.

This problem is solved according to the features of the independent claims. Further embodiments result from the depending claims.

In order to overcome this problem, an apparatus is provided for processing audio and/or video data comprising:

a module for displaying an element comprising at least one absolute time or at least one time indicator;

wherein a sector and/or a portion associated with the element indicates a duration or a length of the audio and/or video data;

wherein time marks are displayed that are set automatically or by user interaction.

Advantageously, the element displayed allows a user to easily and fast perceive and understand the information displayed, e.g., a duration or length of audio and/or video data recorded and/or a free time or a storage space left for recording purposes.

The element and/or sector displayed may be shown in an overlay-technique at a screen on top of a program or video. It can also be displayed in a certain area, in particular in a corner of the screen. The element and/or sector may also be displayed on top of the program, e.g., as a pop-up window.

The module utilized for displaying the element and the sector may be a processing unit or computer comprising a video interface for enhancing, e.g., a television program by the element to be displayed. In addition or as an alternative, the element and/or sector may be depicted on a display that is separate from the actual screen showing a television program, video or the like. In such case, the separate display may be part of or added to the apparatus.

It is to be noted that several such elements may be shown as well as several such sectors or portions of the element may be visualized per element displayed.

As the element displayed comprises at least one absolute time or at least one time indicator it may in particular be a clock associated with an absolute time or with a relative time, e.g., running time of a program, video or show, or time until the recorded session will be over or time associated with free memory storage (time to be recorded), etc. In addition or as an alternative, the element displayed may be a timebar, a portion thereof (e.g., a sub-timebar or a distinct share of said timebar) showing a length or a duration of the audio and/or video data.

The time marks can be in particular displayed temporarily or permanently, e.g., on top of (a portion) of the actual picture or screen or they may be integrated in or part of the element displayed. Such time marks are set automatically or by user interaction (e.g., as bookmarks). Hence, the time marks can be associated with a particular time of the audio and/or video data and may be easily referred to by user selection, e.g., activating a audio/video stream indexed by said time mark. Thus, the time marks can be used to visualize or index certain parts (sections, sub-chapters or the like) of the actual audio and/or video data (stream).

According to an embodiment, the time marks are (each) at least partially associated with picture and/or audio information. Such picture and/or audio information may be at least temporarily displayed.

In a further embodiment, the picture and/or audio information is at least temporarily displayed as at least one thumbnail, in particular as thumbnails associated with a thumbnail bar.

Said thumbnails can be representations of a beginning of a video sequence or scene. A thumbnail may further be realized as a textual representation of, e.g., a bookmark that could be input by a user or generated automatically from information provided, e.g., through an external network (via the Electronic Programming Guide, EPG). Instead of taking the first picture of a video scene, each—even an artificial or externally provided—picture could be inserted as thumbnail information. Upon user's selection, the thumbnail provided may allow the user to jump to the respective time mark associated therewith, in particular to start or replay a (recorded) data stream (e.g., an audio and/or video data stream) at this time mark.

Yet another embodiment allows said thumbnail bar to provide a sequence of scene snapshot information or any other bookmark related visual and/or audio information.

According to a further embodiment, for the purpose of highlighting at least one thumbnail is correlated to a particular time mark within the audio and/or video data.

It is also an embodiment that thumbnail highlighting is performed according to direct navigation by the user within the thumbnail bar or trick play mode induced movement of a line pointer.

Pursuant to an embodiment, the apparatus comprises a device, in particular a remote control, for interacting with a user allowing the user to set time marks and/or to adjust a time base at which time marks are automatically set. In particular, a time mark may be set upon detection of a scene change.

Hence, the user is in particular able via said device to set, amend (edit), delete time marks that may in particular result in adding, modifying an deleting thumbnails to/from a thumbnail bar. Further, the user can edit a time base at which time marks shall be automatically created, e.g., every 30 minutes. These automatically created time marks may also result in thumbnails to be added to said thumbnail bar. Automatically generated time marks (or thumbnails) may be displayed in a (slightly) different format as manually generated time marks (bookmarks) inserted by the user or as other time marks that may be automatically generated, e.g. upon detection of a scene and/or program change.

As another embodiment, the element displayed has a shape of at least a portion of an analogue clock. The element may in particular comprise a disc-like shape or representation.

The disc-like representation may be utilized to advantageously show a certain part or portion of a time. It can be further used to zoom into a usual clock-like representation. In addition, the disc-like representation can be used to give the user an impression of or an association with a clock.

It is also an embodiment that the element displayed comprises a timebar.

Beyond the clock-like representation the element displayed may comprise at least one timebar. A portion or sector indicating a duration or length of the audio and/or video data (lapsed) may in such case be represented by a portion of this actual timebar. The timebar can be perceived and understood easily be a user: A total time can be associated with the full length of the timebar that can be according to a width of a screen. An current position within the total length of, e.g., a video stream, can be displayed as a pointer pointing to a distinct position within the timebar or by a sub-timebar within the actual timebar, said sub-timebar preferably being of different structure and/or color. Furthermore, the timebar can be used to visualize a total length associated with storage space for recording purposes and an actual pointer or sub-timebar may show a position within this total space depicting the actual status of already recorded amounts of data and space left.

Combinations of the displayed elements and the contents shown by such elements may also be applicable. In particular the clock-like shape and the timebar may be arranged on a screen to visualize, e.g., different pieces of information. It is also possible that a user may select the type of element being displayed.

In a further embodiment, the element has a 2- or 3-dimensional shape.

The element, e.g., showing a disc-like shape, can be provided at various angles and/or perspectives, in particular in a 3-dimensional shape from a bird's eye view.

In a next embodiment, the element displayed shows an analogue clock.

It is also an embodiment that the sector or the portion is arranged inside the element.

In particular, the sector or portion may indicate a length or a duration of a recording session and/or a length or a duration of stored program material.

Pursuant to another embodiment, the apparatus comprises at least one storage medium for storing the audio and/or video data.

Such storage medium can be arranged locally with the apparatus. Alternatively or in addition thereto, the storage medium can be provided externally (e.g., as an exchangeable storage such as a memory card, a CDROM, a writeable DVD or a exchangeable hard disc) or within a network environment. Hence, the apparatus may comprise an interface to a network to exchange and/or store/read data to/from the network. Such interface may be an Ethernet interface. The interface may further me wired or wireless.

According to an embodiment, the sector and/or the portion indicates space left on a storage medium.

According to another embodiment, at least one pointer is displayed that points to the sector and/or the portion or to a position within the sector and/or the portion indicating an actual position within the audio and/or video data.

Hence, the pointer efficiently allows the user to recognize the position of the current program within, e.g., the stored program.

According to an embodiment, providing visually and interactively communicating the record and/or playback progress and/or other related status information of audio and video program material to a user, comprising a display for displaying a graphic representation in the form of an analogue clock-analogue clock to the user;

at least one cache sector, graphically represented in a pie chart format;

said cache sector displayed inside said analogue clock-analogue clock indicating the length of a recording session or the length of stored program material;

at least one line pointer that points into one of the cache sectors;

wherein said line pointer indicates the user visually where her or his position is within the program material.

It is also an embodiment that at least one time indicator is displayed, said time indicator in particular providing visual time information in a numerical format in conjunction with at least one line pointer.

Pursuant to yet an embodiment, said at least one line pointer is moved anywhere within each of said cache sectors by action of the user.

Hence, the user may navigate through the data and the result of a user's action is shown by the moving line pointer.

In a different embodiment, the at least one state indicator displays a trick play mode information comprising at least one of the following:

playback,
record,
pause,
slow/fast play,
fast forward speed,
slow reverse,
fast reverse speed.

At least one of said sectors may expand with respect to one of its borders according to the hand movement of said clock symbol when program material is being recorded. In particular, said border of that said at least one cache sector may point in the same direction as the short hand of said clock symbol when the program material is being recorded.

According to a further embodiment, a cache sector and/or portion is displayed representing a recorded time interval of a program. In particular, details of the cache sector and/or the portion may be provided by a zoom functionality. The zoom functionality may further be provided or processed on request of a user. Also, the program recorded may be stored to a logically assigned cache buffer that is preferably distinguishable from further cache sectors and/or portions due to attribute information.

Such attribute information may comprise at least one of the following:
age rating level;
program channel;
source information;
other EPG information;
user defined information;
automatically generated bookmark information.

Said user defined information may in particular comprise information provided by the user in order to differentiate a program or stream from any other program or stream to be stored.

As an option, said attribute information may be visualized by appropriate color or other graphical structure of the cache sector and/or by appropriately assigned text information.

According to yet another embodiment, a sequence of neighboring cache sectors together represent a continuously recorded time interval of program material within a logically assigned cache buffer with each sector having distinguishable attribute information.

As to a further embodiment, more than one overlaying sequence of neighboring cache sectors each recognizable as belonging together are provided representing each a continuously recorded time interval of program material within a logically assigned cache buffer with each sector having distinguishable attribute information. As an option, a continuation of the recording of a program channel when switching to another and the start of recording of a program channel in a logically separate cache buffer is provided in response to user action or automatically on base of user configuration.

According to an embodiment, means are provided for displaying recording and play back relevant device resources in particular as overlay to the cache sector information. Further, information may be provided regarding available free storage resources comprising hard disk drives as well as any other accessible and configured storage medium. As another option, an absolute rest of free storage medium or the free storage medium in proportion to the complete storage medium size may be displayed as sector or ring type overlays of said analogue clock or as pointers to the timebar or sub-timebars associated with the timebar.

In a next embodiment, graphic representation of said analogue clock is automatically reduced to a portion of the analogue clock, in the case that cache sectors do not cover left-out analogue clock parts.

According to an embodiment, details of cache sector contents and attribute information are provided by zoom functionality, whereby a portion of the analogue clock is exploded. As an option, a zoom functionality may be provided on request of the user.

As to a next embodiment, movement of the line pointer into a cache segment together with appropriate control actions allows the user to copy the recording of selected cache sector to be stored permanently, that is outside storage area reserved for cache sectors. As an option, marking of copied cache sectors as having been stored permanently including selected name representation may be supported. In particular, a functionality for visualization of needed free storage in advance of copy to permanent storage may be provided.

According to yet an embodiment, analogue clock, cache sectors and related information as described above is displayed for a predetermined time period.

As a further embodiment, interfaces and functionality of a Set Top Box connected to a TV are provided in particular to allow access to program material via satellite, cable network or IP network.

It is also an embodiment that interfaces and functionality of a TV set are provided that allow access to program material via satellite, cable network or IP network.

The problem stated supra is also solved by a method to be run on an apparatus as described herein.

The problem stated above is also solved by a method for processing audio and/or video data comprising the steps:
an element is displayed comprising at least one absolute time or at least one time indicator, wherein a sector or a portion of said element is associated with a duration or a length of the audio and/or video data;
time marks are displayed that are set automatically or by user interaction.

As an embodiment, said time marks are at least partially associated with picture and/or audio information.

As a further embodiment, the picture and/or audio information is at least temporarily displayed as thumbnails, in particular within a thumbnail bar.

According to yet an embodiment, said audio and/or video data is analyzed and upon detection of a scene change a time mark is automatically set.

It is to be noted that the features described regarding the apparatus apply to the method accordingly.

BRIEF DESCRIPTION OF THE DRAWINGS

Embodiments of the invention are shown and illustrated in the following figures:

FIG. 16 shows a displayed element comprising a timebar and a thumbnail bar.

Figure 1:
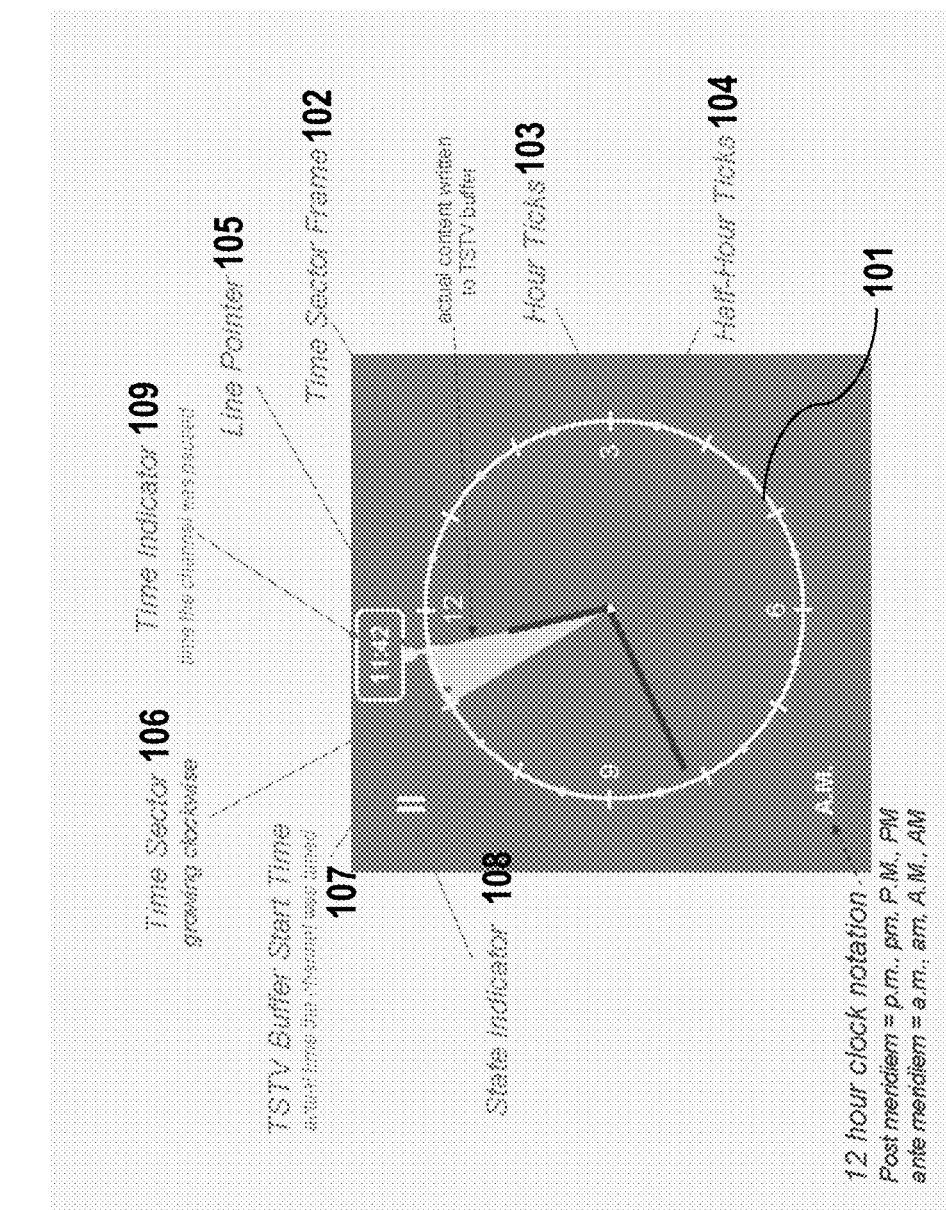
FIG. 1 shows an element displayed preferably on a screen of a video device comprising a sector that indicates a duration or length of audio and/or video data.

Based on appropriate user equipment such as Set Top Boxes (STB) and Personal Video Recorders (PVR) connected to a TV or PCs acting as recording, playback and output devices, an interactive user control of continuously performed recordings can be achieved. User control is improved in particular by providing advanced user friendly visualization capabilities.

Such visualization means may in particular comprise at least one of the following information for interactive user control in multimedia applications:
a current time;
a buffer (i.e. recording) start time;
a used buffer (e.g., occupied disc memory configured as recording buffer) size of recording;
a maximum buffer size reached;
a playback position within the recording;
a trick play mode and/or a speed (e.g., forward, rewind speed);
automatically set or user defined bookmarks;
for contents with age rating, a rating may be displayed in a current capture buffer;
a remaining hard disk space for capturing (space left for recording/capturing);
a display of buffer content using thumbnails, e.g., at scene changes or somehow defined highlight related content parts;

a source identification (e.g., TV channel) and a program identification (e.g., program name) for supporting user features (e.g., channel zapping and permanent storage support);

a zoom-in feature for visualizing a buffer in greater detail as well as for efficiently utilizing the space available on a TV screen;

The graph can be displayed as an overlay on the active or on any other screen. Such overlay may be transparent or intransparent. The overlay can be provided as or similar to a pop-up window.

Graphical Layout

An element can be displayed comprising at least one absolute time or at least one time indicator, said element being, e.g., a timebar and/or a graph that has at least partially the shape of an analogue clock.

Further, time marks can be displayed together with the element, said time marks being set automatically or upon user interaction. A time mark may in particular be associated with picture and/or audio information and may help the user to identify a starting point or a bookmark of a scene, section, program or the like.

A graph uses an analog clock image which informs the user about the current time and the currently used buffer size, i.e. the already for intermediate storage occupied part of a total buffer. Such buffer may have been preconfigured.

The used part of the buffer is represented as a sector of a circle. When buffering is activated, a colored sector whose right edge sticks to the short hand of the analog clock is opened and defines the moving end mark of the buffer. As long as the maximum administrable buffer size is not reached, the left edge of the buffer sector sticks on the short hand position of the clock at the time when capturing was started. If the full buffer time, i.e. the complete configured buffer has been used up, the buffer sector changes its color and/or hatching and the left edge of the sector begins to follow the short hand of the clock within a constant distance.

Updates of the graph are possible at any time interval, e.g., similar to an analog clock (e.g. every minute or less) or—according to a user's perception—continuously.

Trick Play Mode

A trick play mode is entered, e.g., in advance of a regular playback of content recorded to the buffer.

Entering trick play mode may advantageously activate a slider that moves with the buffer sector. The slider depicts the current time within the buffered/recorded content. When the slider reaches the left angle of the time sector, which represents the beginning of the buffered/recorded multimedia stream, this may result in resuming normal playback.

When reaching the right angle of the time sector, this may result in jumping to live TV in case of time-shifted TV.

The current trick play mode (e.g. rewind, forward, pause) may advantageously be indicated by a symbol according to the corresponding command, e.g., by a key of the remote control and may be extended by the applied trick play speed.

Analog clocks and/or timebars with less or more than 12 hours display capability (e.g., 24 hours) may also be used for disk space and/or non-disk space related embodiments according to the approach presented herewith.

Age Rating

Trick play mode may also consider an age rating status. Hence, partial sectors with content of different age rating may not be visualized or simply omitted if a user watching is not admitted to such age rating level.

Attempting playback of parts with higher age rating (as actually permitted) may lead to an access control (e.g., via PIN request). After successful access verification the time shift buffer will be displayed as having sectors with, e.g., different color and/or hatching and/or with an icon as representation of different age rating of the assigned recorded content in the Time Shift Buffer.

Alternatively, buffered content with a higher rating may be automatically skipped during playback operation without explicitly requesting access verification. In such case, the visualization of the Time Shift Buffer will consider only recorded portions appropriate to the currently admissible rating level of the user (i.e., non-appropriate parts of the record will be concealed.)

Free Disk Space

An integrated indication of the remaining free disk space (e.g., in hours or gigabytes or percentage of usage/free space) outside the Time Shift Buffer can be provided in various ways.

A rough indication may be given in form of, e.g., a colored ring around the analog clock-like representation thereby indicating a storage capacity that is larger than 12 hours. A disc capacity representing less than 12 hours can be displayed as a partial ring decreasing counter-clockwise with, e.g., a different and/or a changing color (e.g., by increasing a saturation of a particular color, e.g., red).

The free disk space can be displayed as proportional sized sector of the clock symbol or as part of a timebar. This however, is in particular useful unless the memory (disk space) is not almost completely occupied.

Bookmarks and Thumbnails

User defined bookmarks or automatically generated bookmarks (e.g., via scene change detection or automatic highlight detection techniques) can be visualized by additional indicators that may be included and/or represented in a time-adequate manner.

Optionally, thumbnail information of beginning scenes or other highlighted visual content (e.g., a picture of the related scene) may be provided to support convenient selection possibilities to the user.

Bookmarks and/or thumbnails may be visualized as a clock and/or as a timebar and/or a graph associated with said clock and/or said timebar.

Content Indication

In case of a channel change, the Time Shift Buffer may contain parts from different channels or parts background recorded from channels not conveyed to the output device of the user.

In addition, identification information provided by an electronic programming guide (EPG) or by any other source (e.g., the Internet) may be utilized.

Further, multiple buffering (in parallel) may be supported and integrally visualized. For enhanced user convenience purposes, source channel and program title can be recorded together with the program data, thus enabling precise identification and visualization of the content of the recorded sectors in the time shift buffer.

With assigned indication the user will in particular be able to selectively address and delete part of the time shift buffer as well as to copy recorded parts out of the Time Shift Buffer to the permanent disk storage taking advantage of easy handling and immediate visualization of assigned changes of free disk space.

Screen Space Consumption

On user request a zoom-in functionality can be provided thereby showing detailed information of the contents recorded in the Time Shift Buffer as described above.

Such visualization is advantageously provided in a transparent way (overlay technique on top of the current video picture) and it may occupy a large part of the TV screen as long as it is required for administrating purposes.

If no such detailed information and view is required, a screen space occupation will be reduced, e.g., showing a partial clock (e.g. 90 or 180 degrees sector of the clock), preferably positioned in appropriate edges of the screen.

Further Details on the Embodiments:

FIG. 1 shows an element displayed on a screen of a video device comprising several items used in the time shift buffer usage visualization, in particular:

Time sector frame 102: Provides the intuitive base for buffer usage and current time in form of the shape of an analog clock 101;

Hour Ticks 103: Provide a rough scale for time orientation purposes;

Half-Hour Ticks 104: An option to give a more precise overview on buffer size used;

Line Pointer 105: Feedback pointer for a current position in the recording buffer during trick play activity with additional information regarding the time within the buffer sector;

Time Sector 106: A clockwise growing sector visualizing the used buffer for time shift TV recording; a sector between two Hour Ticks describes a buffer size of one hour;

TSTV Buffer Start Time 107: Indicates the beginning time of the TSTV recording, in particular an actual time when the channel was tuned;

State Indicator 108: It gives a graphical representation of the current state of the device, e.g., Pause, Play, Fast Forward (FFW), Rewind (REW), "Set Bookmark", "Jump to Bookmark", FFW speed, REW speed, Slow Motion etc.

Time Indicator 109: It provides a visual feedback to the user about the time of the displayed time shifted stream in relation to live broadcast. The display format of the time indicator may be [hh:mm] or [hh:mm:ss]. In the example of FIG. 1, the Time Indicator 109 shows the time the channel was paused (see State Indicator 108 visualizing the "Pause" symbol).

Day Time Indicator: It identifies the live time (short hand of the clock).

Functional Description:-

Without activation of time shift TV (TSTV) the graph shows the analog clock 101 with the current time. The clock is updated in regular time intervals (e.g., every minute). TSTV can be permanently active or may be started by, e.g., tuning into a channel, by Pause and/or by Stop live TV.

Starting of TSTV causes a time sector 106 to open—at the very beginning a single line indicating the left edge of a growing sector—within the clock as shown in FIG. 1. The starting edge/line is in parallel to the short hand of the clock and will remain in that position until the buffer has reached the administrable maximum buffer size. During the running buffering the right edge of the sector follows the short hand until buffering is stopped.

Figure 2:
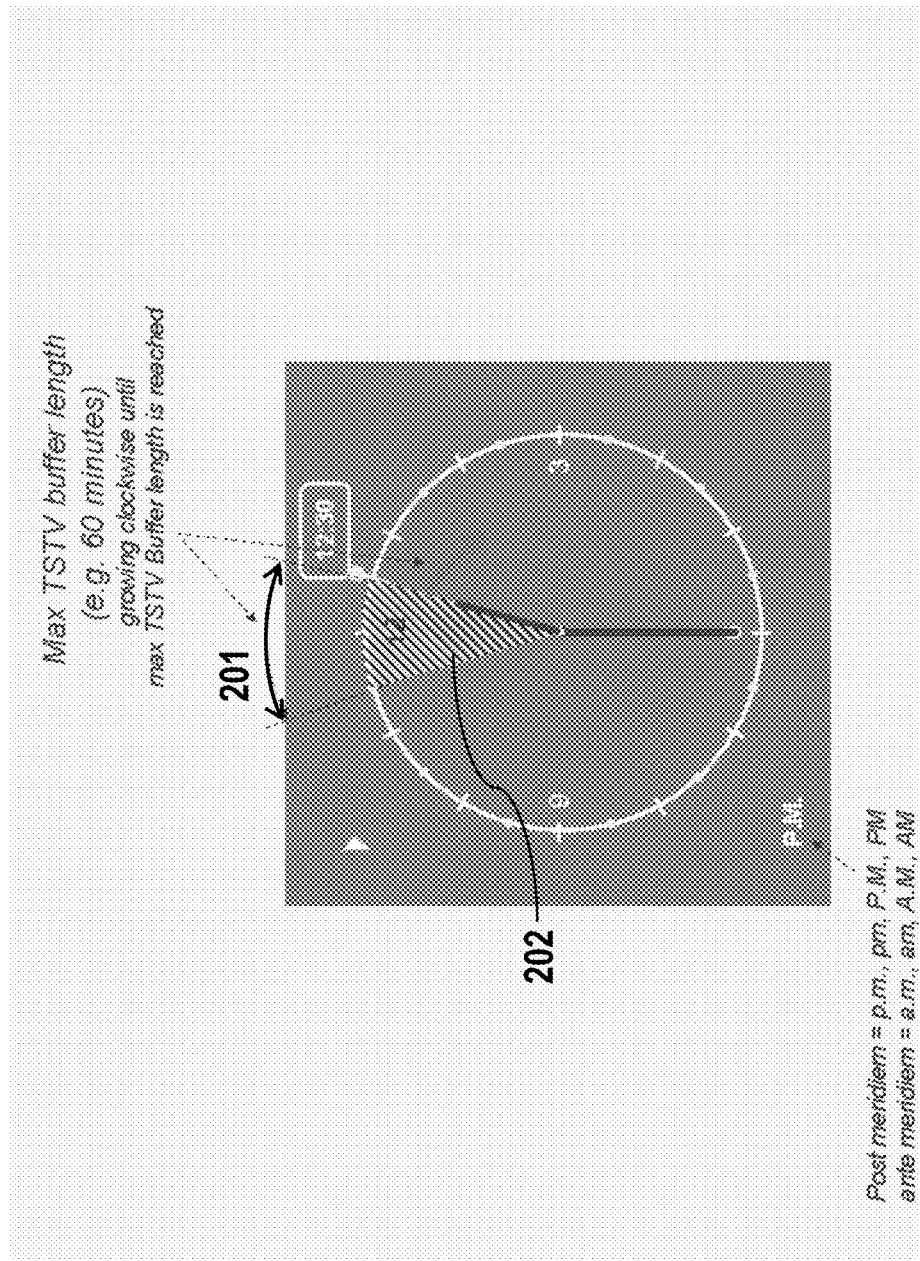
FIG. 2 shows a displayed element visualizing a buffer with a predefined size, wherein the buffer limit has been reached during recording of a program.

When buffering exceeds the maximum buffer size the color/hatching of the sector changes and the previously fixed left edge of the sector starts to follow the right edge of the sector with then constant distance (see FIG. 2).

Together with the buffer sector the Line Pointer 105 will be shown. The default position of the Line Pointer 105 is the current time (short hand) and it follows the live TV play. The Line Pointer 105 is used to display the position within the buffer sector during trick play activities. That means starting a fast rewind session will cause the Line Pointer 105 to move from the short hand (backwards) into the buffer sector. While moving, the screen background may preferably show the backward moving content similar as to what is perceived when applying backward winding with VCR and DVD players.

All trick play commands can be displayed as State Indicators 108, e.g., in the left upper corner of the overlay screen.

The Time Indicator 109 provides feedback to the user about the time of the displayed time-shifted stream from the hard-disk drive in relation to the live broadcast. The Time Indicator 109 is stuck to the upper end of the Line Pointer 105 and slides together with the Line Pointer 105 clockwise or counter-clockwise according the current trick play mode.

FIG. 2 shows that an administered maximum TSTV buffer size 201 has been reached. The sector 202 has reached its maximum width. With ongoing recording, this fixed size sector 202 follows the short hand of the clock and informs about the latest possible time for reviewing the buffer. The left edge of the sector defines the latest entry in the buffer. The right edge is equal to the current time.

Figure 3:
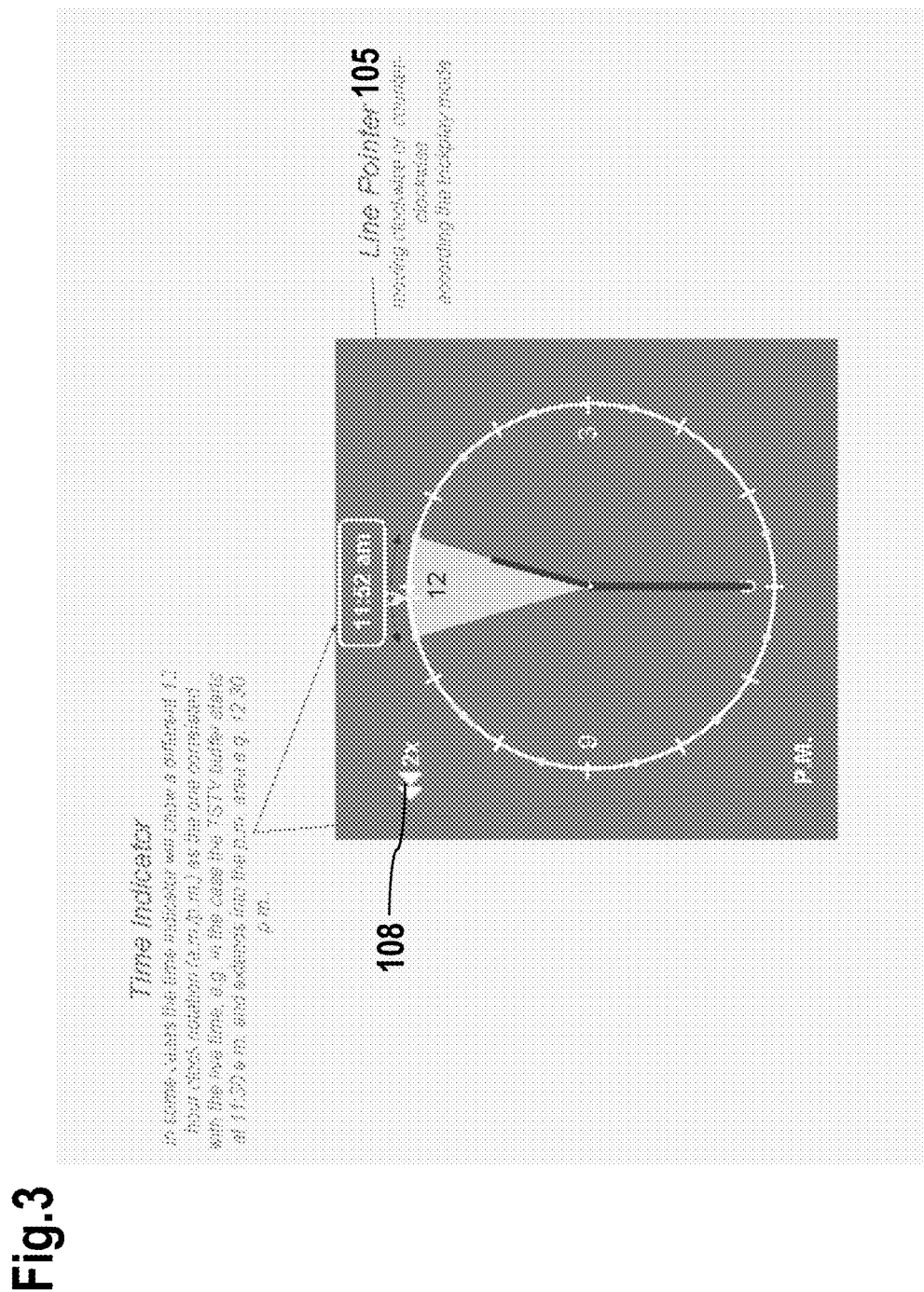
FIG. 3 shows a displayed element depicting a trick play activity in particular visualized by a time pointer.

FIG. 3 depicts a trick play activity with the Line Pointer 105 moving within the boundaries of the buffer sector. The recording buffer has not yet reached its maximum administrable buffer size. The current trick play mode (State Indicator 108) is displayed in the e.g. upper left corner of the figure.

The time indicator may in some cases show a different 12 hour clock notation as the one correlated with the live time. For example, if the TSTV buffer starts at 11:30 a.m. and extends into the p.m. area, e.g., 12:30 p.m.

Figure 4:
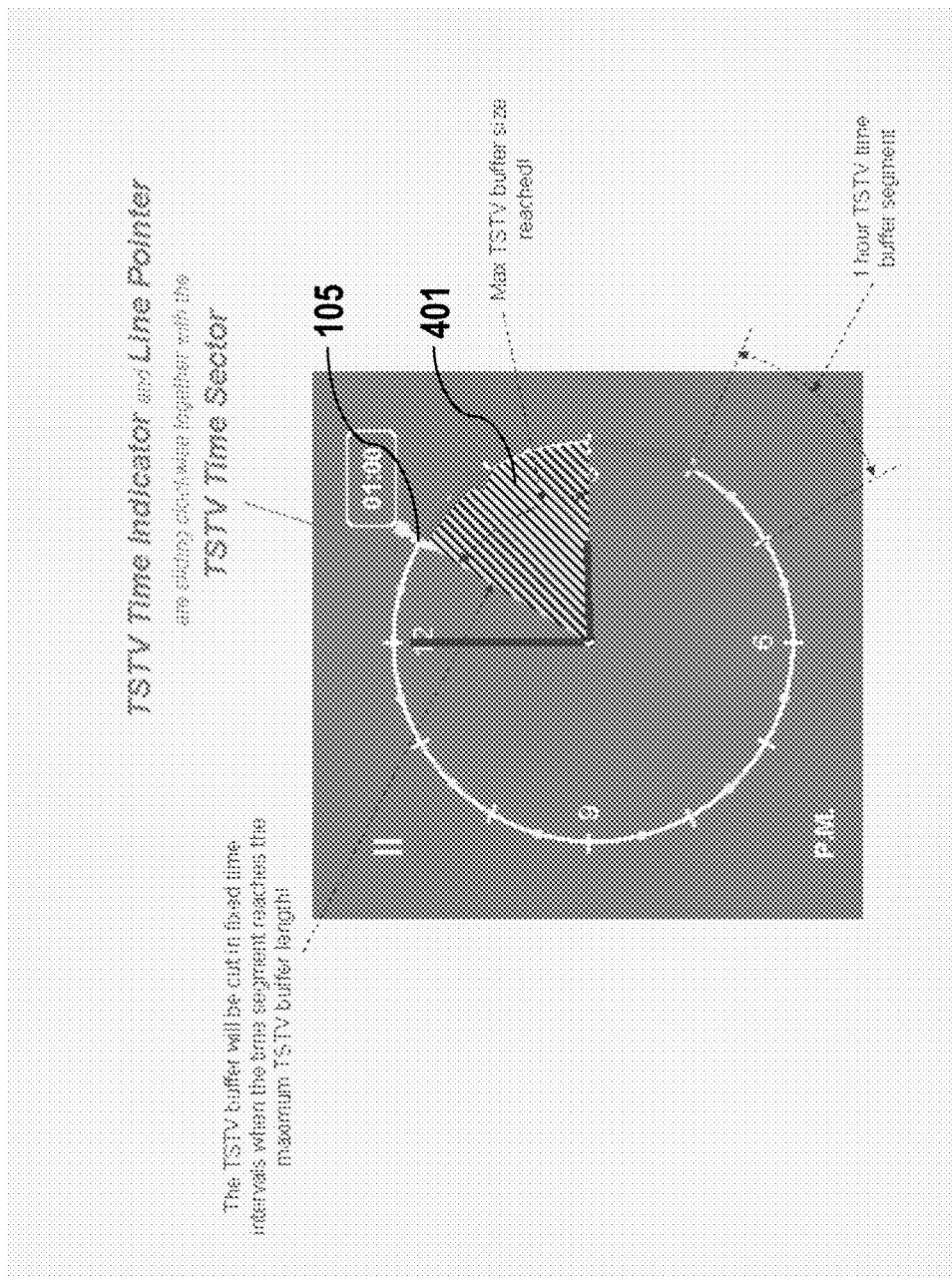
FIG. 4 shows a displayed element depicting a buffer size for recording that has reached its upper limit.

FIG. 4 shows a buffer sector 401, which has reached its maximum size and the left edge of the buffer sector is following the right one with a fixed distance of two hours.

The indication for reaching the maximum buffer size is, e.g., the changed color/hatching within the buffer sector.

When no trick play mode is active, the Line Pointer remains on its last position except for the case when the left edge of the moving sector reaches the line pointer. In such case the line pointer sticks on the left edge of the sector and follows it.

Figure 5:
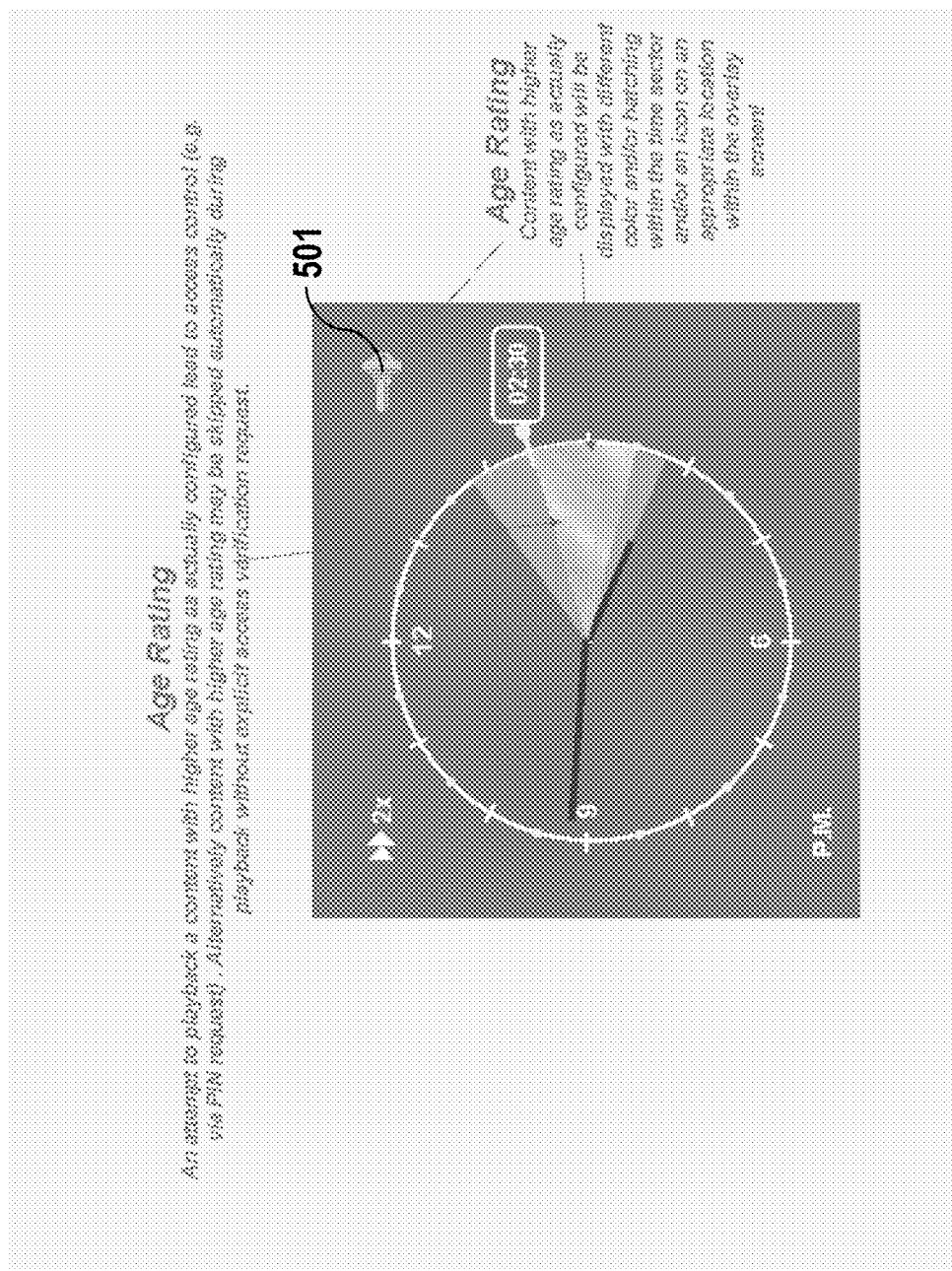
FIG. 5 shows a displayed element depicting an age rating feature.

FIG. 5 describes the scenario according to which data of a higher age rating as the one actually configured is accessed.

This action will initiate an access control mechanism (e.g., via a PIN request). Alternatively, content of higher age rating may be skipped manually or automatically during playback without explicit access verification request. Content with higher age rating as actually configured can be displayed with different color and/or hatching within the time sector and/or an icon 501 on an appropriate location within the overlay screen. Content of higher age rating than configured can be completely concealed or—as an option—it may be depicted as additional sector(s).

Figure 6:
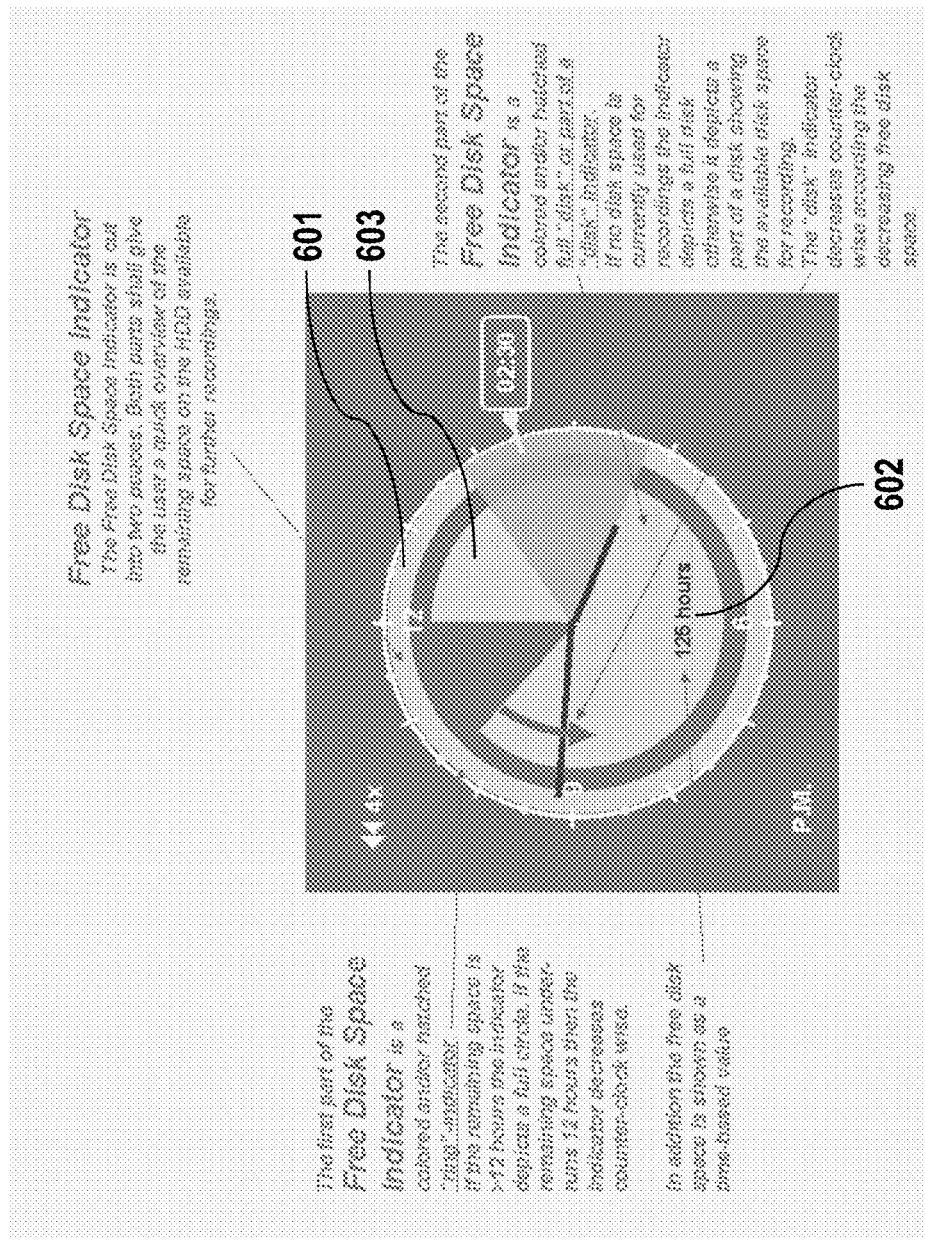
FIG. 6 shows a displayed element depicting a ring and a cake chart showing in particular remaining free disk space.

FIG. 6 shows an extension: The remaining local disc space which allows more than 12 hours of recording and/or buffering time is indicated by a closed colored ring 601. The remaining free disc space can be displayed as additional information 602 in the overlay screen in terms of time (hh:mm:ss) or disk size, e.g., in gigabytes. The cake chart 603 displaying the remaining total disk size decreases counter-clockwise with every new record and/or buffer entry that consumes disk space.

Figure 7:
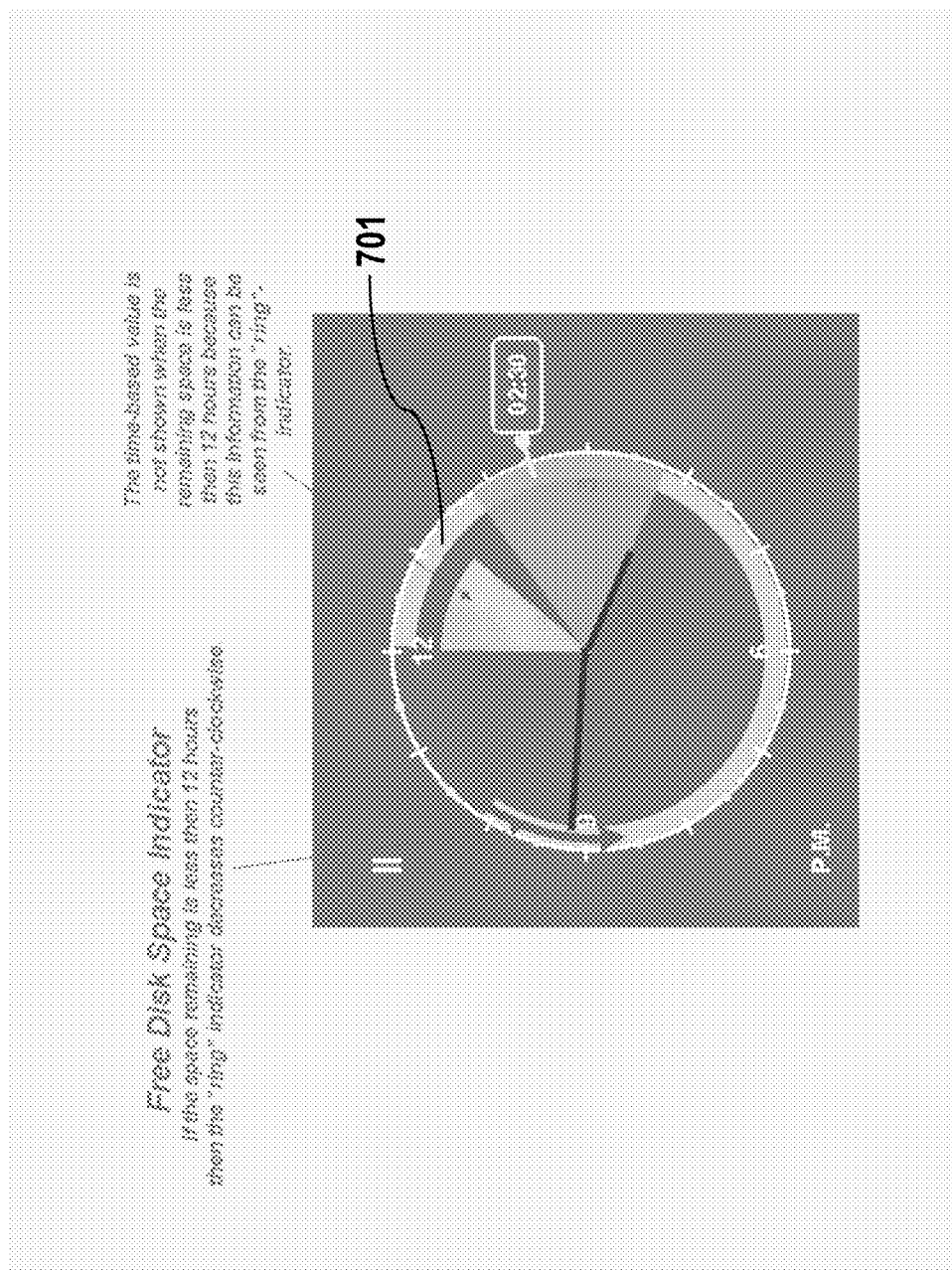
FIG. 7 shows a displayed element depicting an example according to which a local disk space has decreased below 12 hours time of recording and/or buffering.

The ring 701 of FIG. 7 indicates that the remaining local disc space for buffering has decreased to less than 12 hours (in this example to about 10 hours). With ongoing time and active recording the ring will open more and more counter clockwise indicating the decreasing local disc space.

With administrable thresholds set (e.g., remaining hours of disc space) the ring color may change to intensify the visualization of running out of local disk space. In particular as of the limited sector size (total disk space remaining) the numerical field visualizing a figure of free disc space may disappear, but this information can then be shown in greater detail by the decreasing colored disk space ring 701.

Optionally, disk space for recording and disk space for buffering can be configured logically as separate areas of a disk. However, both can also utilize the same disk space and still be logically separated. Alternatively, disk space for buffering and or recording can be logically administered and physically distributed among several different actual physical storage media.

Figure 8:
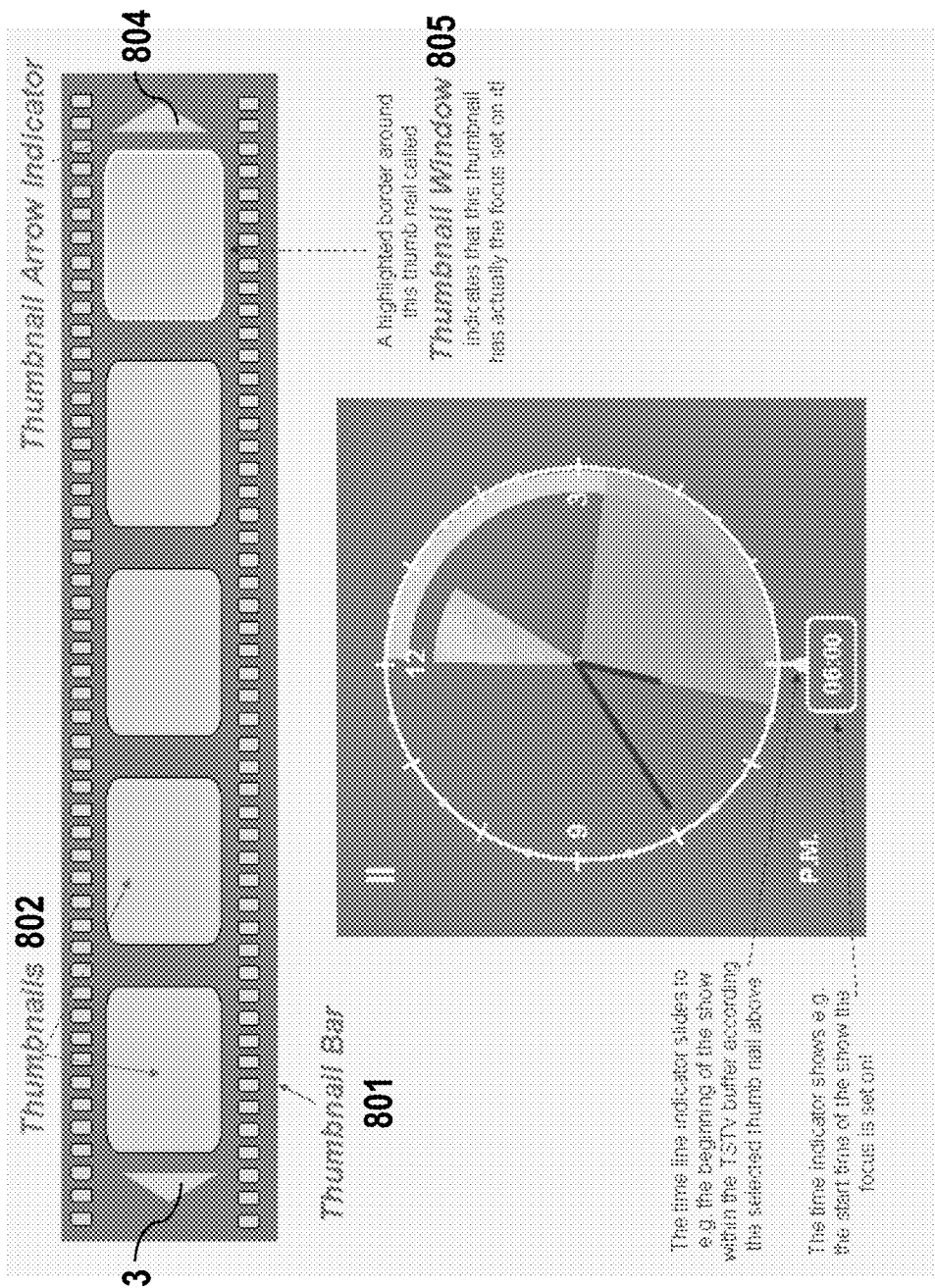
FIG. 8 shows a displayed element comprising a thumbnail bar with thumbnails indicating entry points to the recorded and/or buffered program.

FIG. 8 shows an extension for a convenient search and access method in/to the buffer sector.

During buffering the buffer content may be scanned for, e.g., changes within scenes. For a change of scene found, the first image of the new scene can be used as a still image utilized to build up a thumbnail bar 801 on the screen (said bar can be located, e.g., on top or at the bottom of the screen).

Bookmarks can be set by the user and may also be inserted as thumbnails 802 into the thumbnail bar 801. In addition or as an alternative, a beginning of a new show can be inserted with a still image to the thumbnail bar 801.

Thumbnail arrow indicators 803, 804 on both sides of the thumbnail bar 801 point to further thumbnails that are currently not shown on the screen.

A thumbnail window 805 is used for highlighting a specific thumbnail (e.g., by yellow border around the actual thumbnail) can be moved along the thumbnail bar 801 for selecting a thumbnail and upon such selection, playback will directly continue with the buffered content starting with the thumbnail selected.

Displaying the thumbnail bar 801 may be set up via configuration setting or on demand (e.g., via starting trick play mode, setting bookmarks manually, special button on the overlay screen, hotkeys on the remote control).

Figure 9:
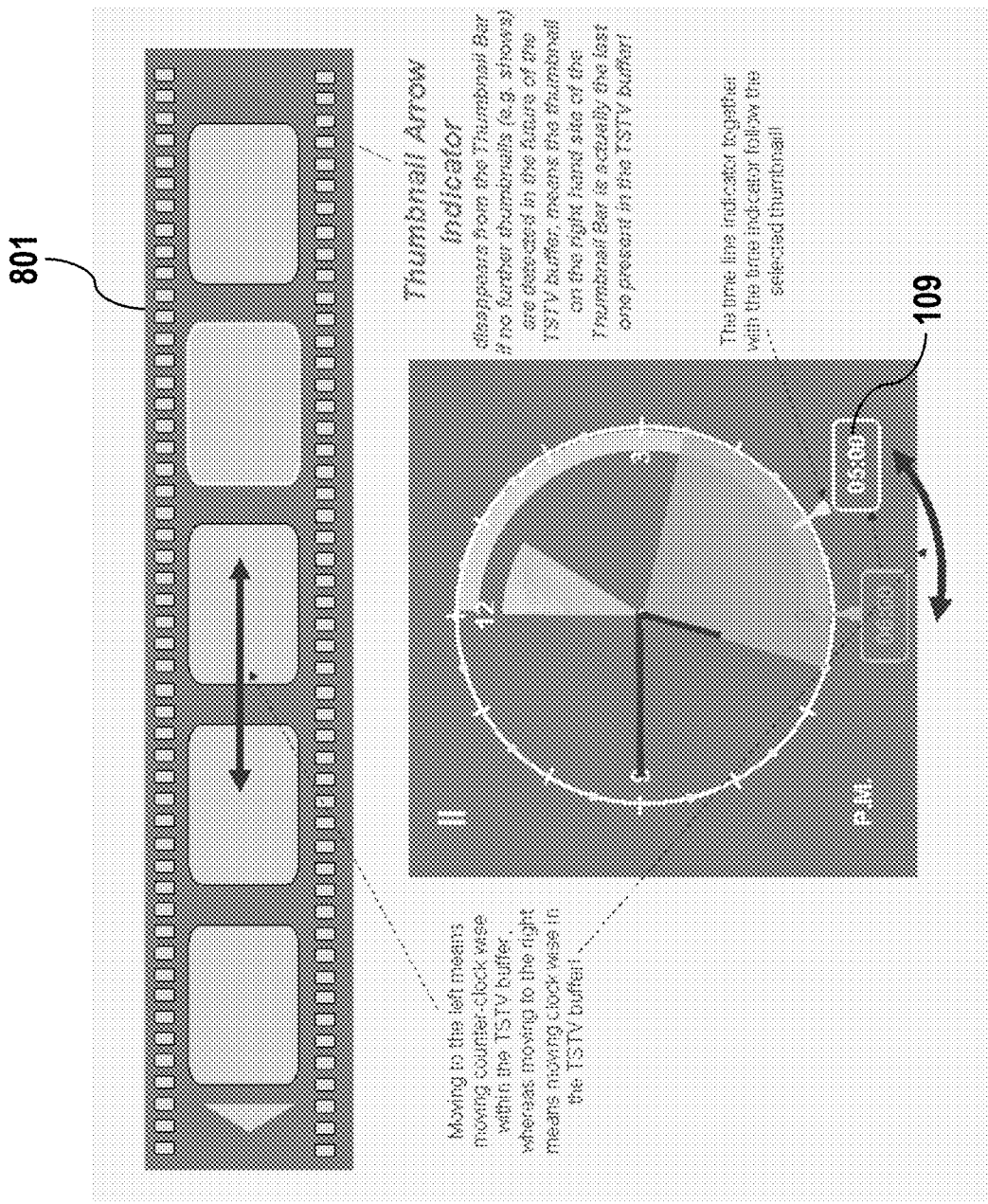
FIG. 9 shows a displayed element comprising a thumbnail bar with thumbnails visualizing navigation possibilities through the stored program.

FIG. 9 shows the situation when the end of the buffer (in this case: current time equals the time of live TV streaming) is reached. The right thumbnail arrow indicator has disappeared.

Selecting a thumbnail via the thumbnail window causes an update of the Time Indicator 109 position within the buffer sector in order to display the appropriate time in the buffer. The digital time indicator is also updated consistently.

Moving the thumbnail window to the left means moving backward in the buffer sector. Moving the thumbnail window to the right corresponds to a fast forward movement towards live TV.

Figure 10:
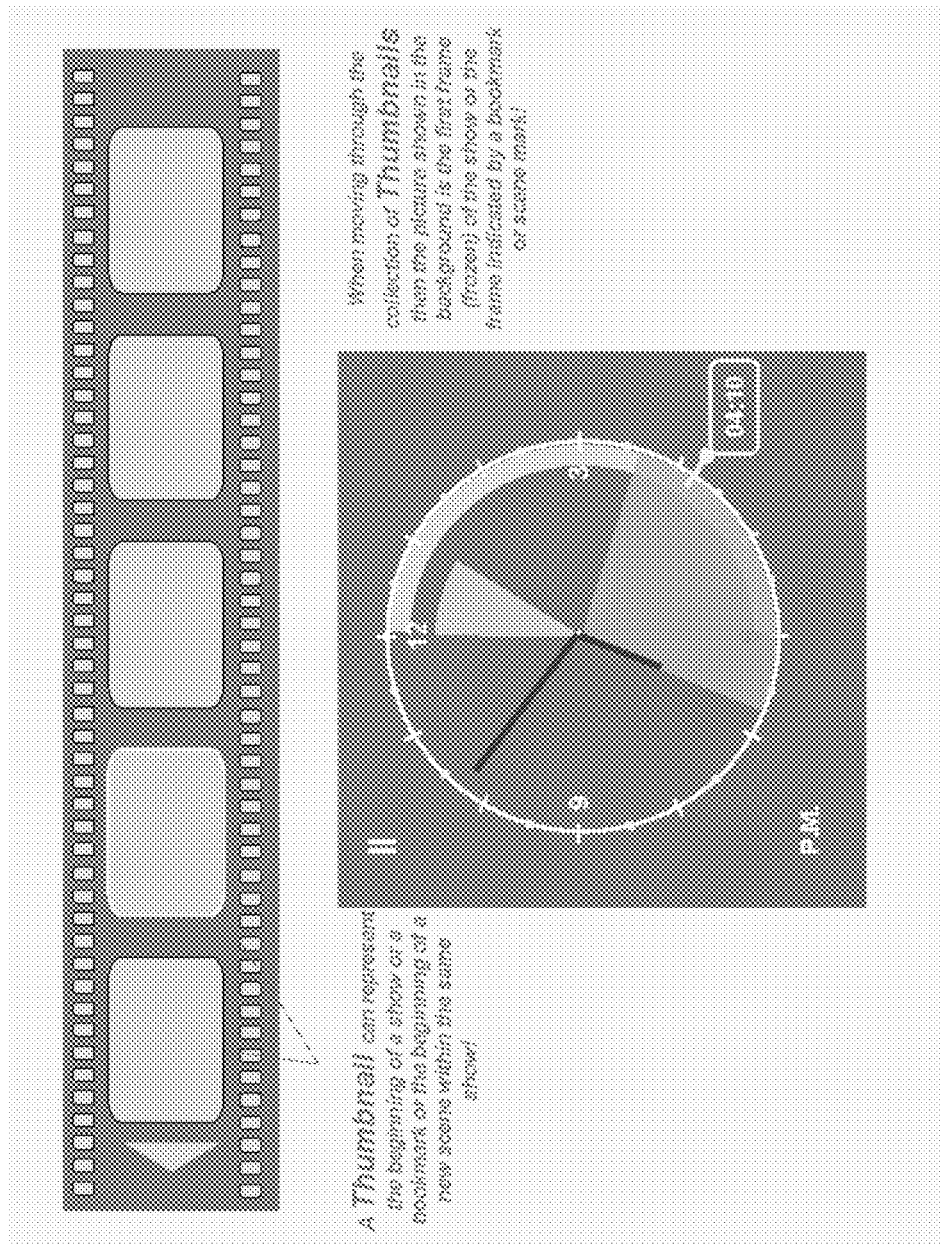
FIG. 10 shows a displayed element comprising a thumbnail bar with thumbnails visualizing further possibilities for navigation.

According to FIG. 10, thumbnails can represent the beginning of a show, a bookmark or a scene change or any other indication. When moving through the sequence of thumbnails the picture shown in the background of the TV screen is the first frame of the show/program or the frame indicated by a bookmark or scene mark.

Figure 11:
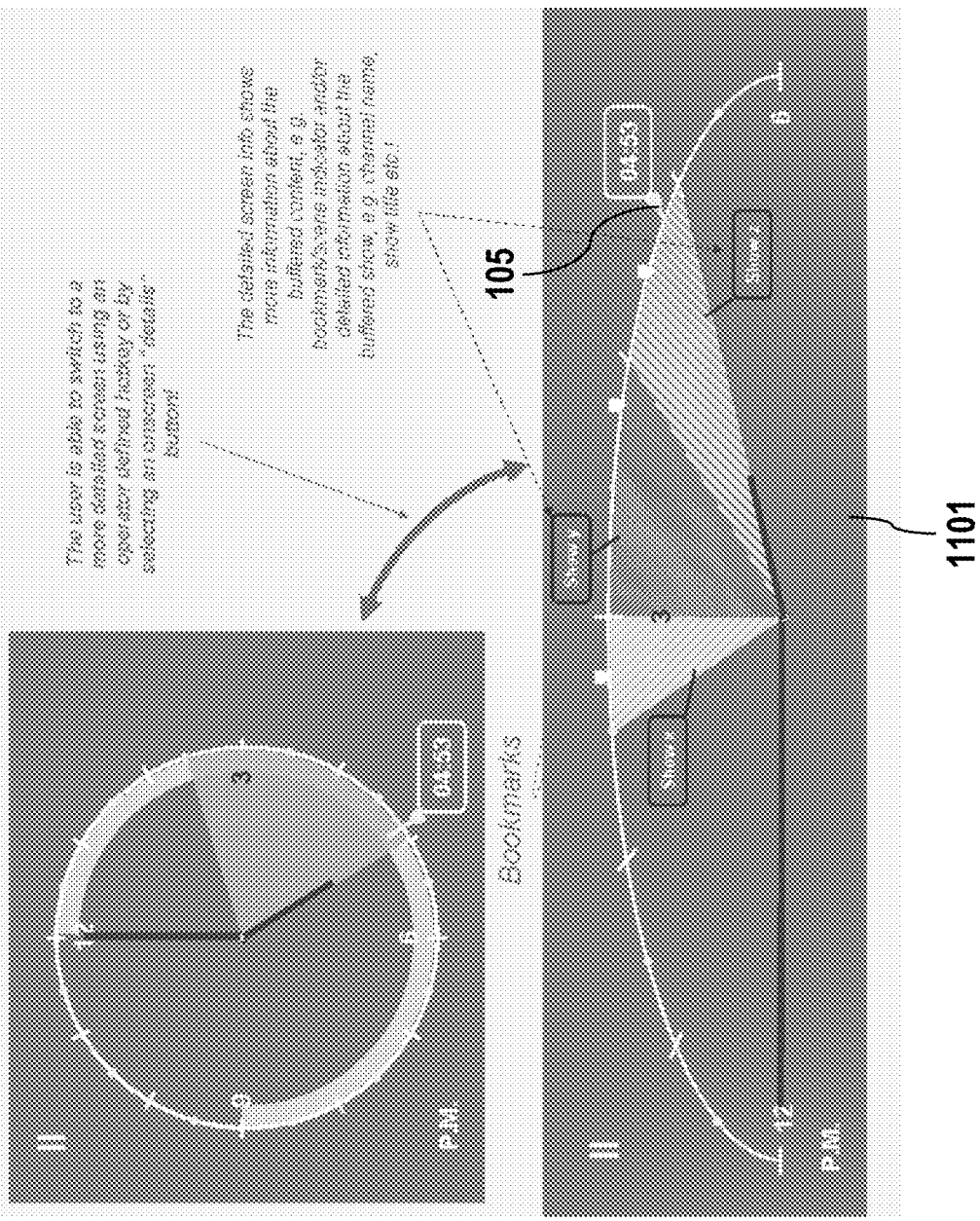
FIG. 11 shows a displayed element comprising zoom-in functionality to visualize a portion of the displayed element in greater detail.

FIG. 11 depicts a zooming feature into the buffer sector in order to allow a more detailed screen 1101 per program contained in the buffer.

The detailed description may comprise EPG data, program title, encoding parameters (e.g., Dolby, wide screen, etc.), short program summary or any subset of other related information in particular available depending on the available screen space.

For example, the user switches to the detailed screen 1101 using an operator defined hotkey, by selecting an onscreen button or a dedicated key on the remote control.

Addressing the different buffer sections can be done via trick play operations or via thumbnail selection. The current position within the buffer being indicated by the Line Pointer 105.

Figure 12:
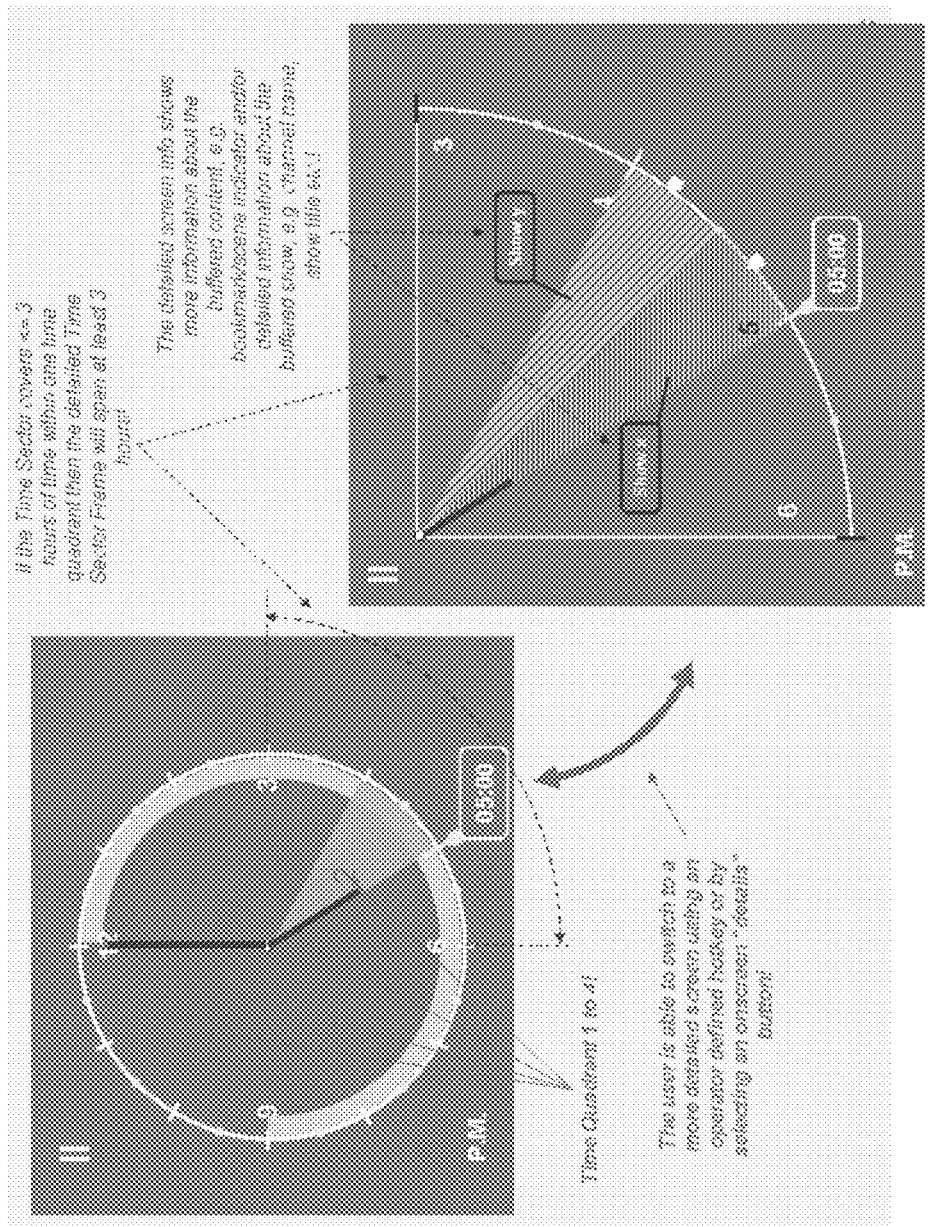
FIG. 12 shows a displayed element comprising an alternative zoom-in functionality to visualize a portion of the displayed element in greater detail.

FIG. 12 depicts the zooming feature in case the buffer is within a quarter of the clock circle. It shows an alternative way for zooming into a buffer sector with less than 3 hours of buffered content.

Figure 13:
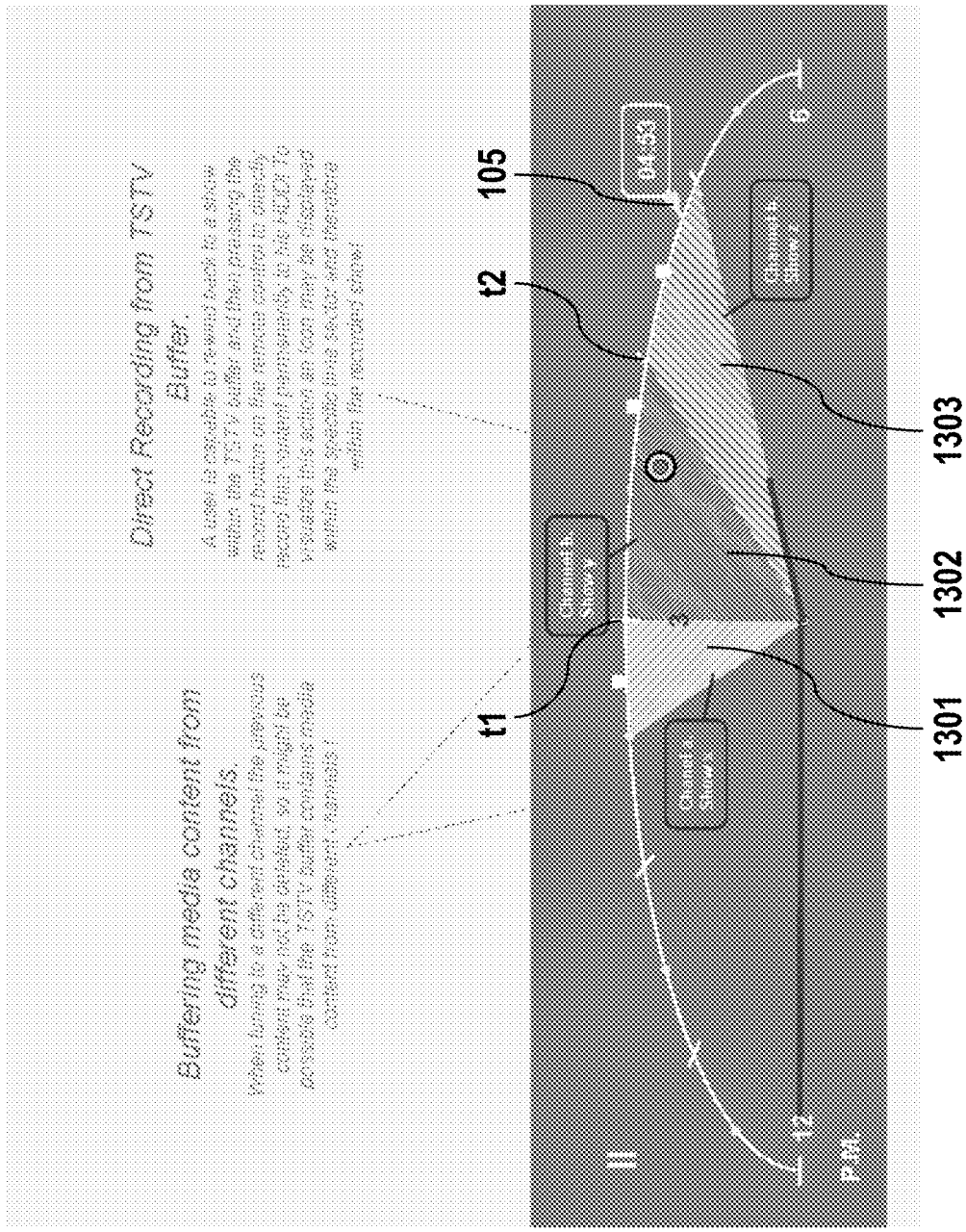
FIG. 13 shows a displayed element comprising a buffering functionality for more than one channel.

FIG. 13 displays the buffering of more than one channel.

Various channels that are recorded during changing of or zapping between the channels can be identified, e.g., via dedicated colors/hatching and naming (e.g., channel number and/or channel name).

According to FIG. 13, a sector 1301 depicts a buffered show x of channel a, a sector 1302 depicts a buffered show y of channel b and a sector 1303 depicts a buffered show z of channel b. A change of channel has occurred at a time t1 between channel a and channel b.

The user wants to store the part of show y starting at time t1 and ending at a time t2, which corresponds to the end of the show y.

The system is capable of detecting the beginning and the end of programs/shows automatically based on EPG or other information that may in particular be accessible in real time via the Internet. In order to initiate the copy process for the targeted program from the buffer to the permanent disk storage area the user may, e.g., rewind the Line Pointer 105 into the buffered recording area and press the record button on the remote control. By doing so the system automatically identifies the related buffer sector (of channel b, show y) and assigns an automatically generated or user selected file name to the copied content. Thereupon, the user has a record added to the set of his permanent recordings (content library). As an option, an icon can be displayed in the copied buffer sector.

Figure 14:
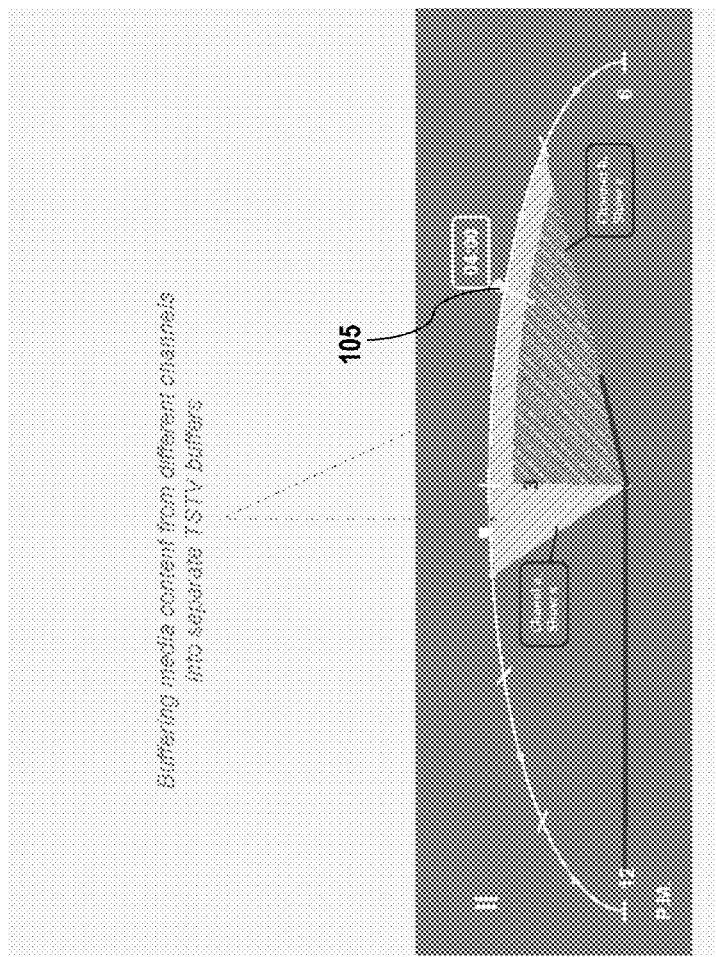
FIG. 14 shows a displayed element comprising several buffers to depict a buffering functionality for more than one channel.

According to FIG. 14, the first record (channel a, show x) has been started and will continue recording while the user is changing to another program channel (channel b).

At three o'clock the user has started viewing channel b, show z. Due to the existence of two time shift buffers the system is able to record channel a and channel b in parallel. The fact of parallel recording in multiple buffers is visualized via more than one sector diagrams within one time sector frame. As described above, the user is still able to move the line pointer by appropriate trick play operations (e.g. line pointer move to 4:00 pm).

According to this embodiment there is one Line Pointer 105 for both buffers. This means, if the user is watching channel b, enters trick mode and moves the Line Pointer 105 back, channel change to channel a leads to live TV output of channel a and the Line Pointer 105 moves to the current time. Subsequent change to channel b leads to a repositioning of the Line Pointer 105 to the current time.

According to another embodiment there can be two dedicated line pointers for channel a and channel b. Thus channel change will not lead to repositioning to current time. The positions of the line pointers will be saved per channel if the user changes the channel.

In case of zapping and if several buffers (for various channels) are available, immediate buffering can be provided. However, buffered content can be deleted immediately after changing to another channel within a configurable time. Thus, the multiple time shift buffers will be used economically avoiding the creation of very short buffer sectors that may be of no further interest to the user. While remaining for an administrable period of time in another channel a further buffer sector will be accessible to the user.

Alternatively, when changing to another channel buffering may start after a configurable time period without further channel changes.

In case of multiple buffer support the assignment between program channel and buffer may be controlled manually by the user or automatically by the system.

Figure 15:
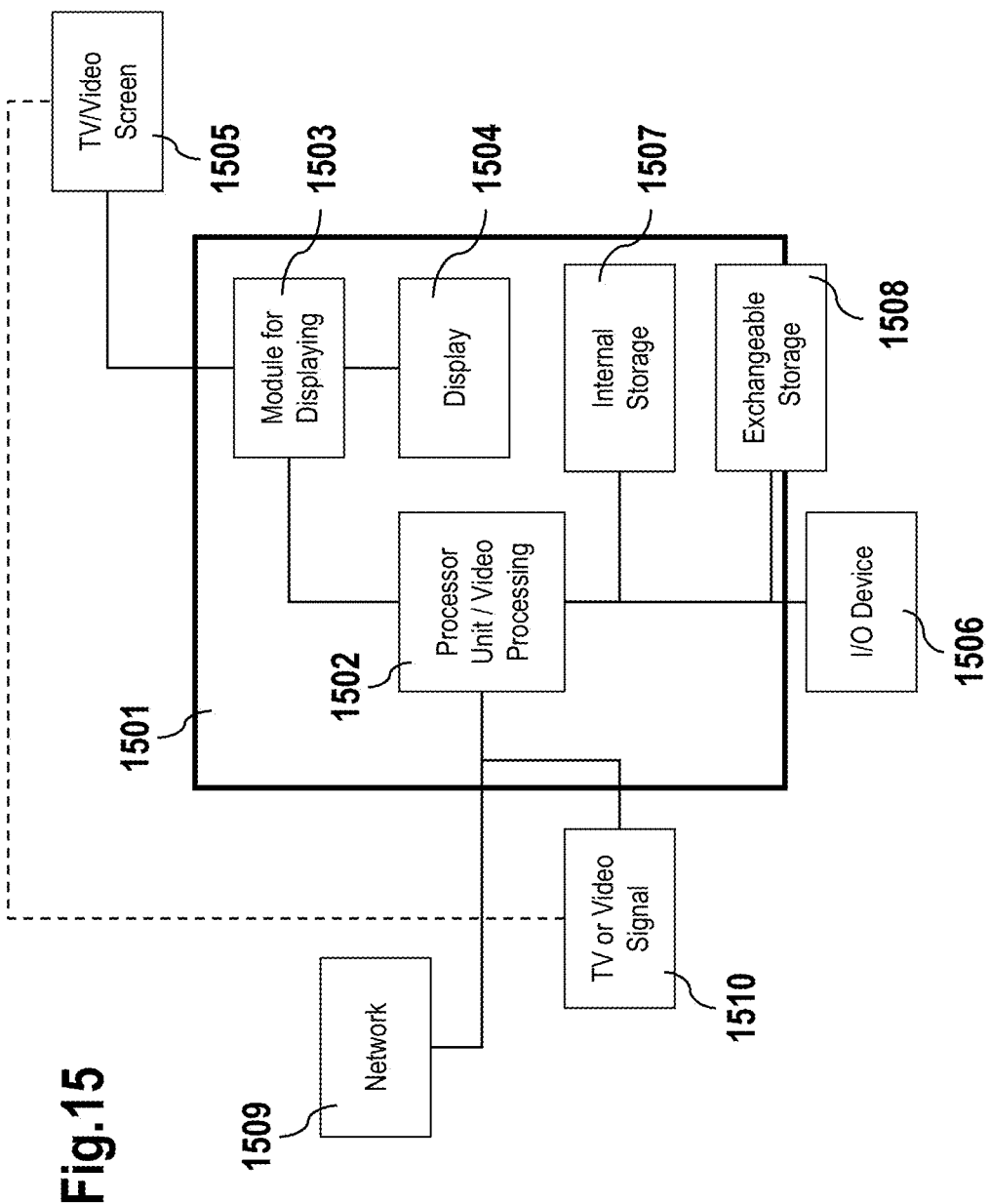
FIG. 15 shows an apparatus for processing audio and/or video data.

FIG. 15 shows an apparatus for processing audio and/or video data.

The apparatus 1501 may be realized as a set top box or as a separate component to be connected to a TV device. It may further be integrated within a TV device.

The apparatus 1501 shows a module 1502 comprising a Processor Unit as well as a

Video Processing Unit. This module 1502 administers all kind of digital/analog processing required regarding incoming and outgoing signals. Preferably, the module 1502 is connected to a Module for Displaying 1503, to an Internal Storage 1507, to an External Storage 1508 and to an I/O Device 1506 via a bus.

The I/O Device 1506 may be connected to a remote control or any kind of keyboard that provides signals via a wireless or via a wired interface. The I/O Device 1506 can also be realized as an interface to which a remote control and/or a keyboard can be connected. The I/O Device 1506 is preferably utilized for inputting data into the apparatus 1501, in particular for configuration, set up and/or programming purposes.

The Internal Storage 1507 as well as the External Storage 1508 may each comprise at least one storage medium, e.g., a random access memory (RAM), a hard disk drive, a memory card or the like. Preferably, the Internal Storage 1507 is realized as RAM and/or as a hard disk drive for buffering purposes whereas the Exchangeable Storage 1508 is realized as exchangeable hard disk drive for storing programs, e.g., for archiving purposes.

The Module for Displaying 1503 may comprise in particular a display driver for an internal Display 1504 as well as for a TV/Video Screen 1505. This TV/Video Screen 1505 is utilized for watching television or video that may in particular be provided via a TV or Video Signal 1510. In this embodiment according to FIG. 15, the TV or Video Signal 1510 is conveyed via the Video Processing 1502 towards the TV/Video Screen 1505. This is an option if processing of the TV or Video Signal 1510 is required (e.g., decryption, signal processing or the like).

However, the TV or Video Signal 1510 may also be conveyed directly to the TV/Video Screen 1505 (indicated by the dashed line).

The Module for Displaying 1503 provides signals that can preferably be put on top of the actual TV or Video Signal 1510 and may provide information as described herein.

In addition or as an alternative, the Module for Displaying 1503 may provide information to be shown on the Display 1504, wherein said Display 1504 can be provided with or attached to the apparatus 1501. This Display 1504 may be an option, but it can also be provided in addition to the signals depicted on the TV/Video Screen 1505. In particular, the Module for Displaying 1503 may distribute information to be depicted among the Display 1504 and the TV/Video Screen 1505 to advantageously provide the user with current information, but limiting the disturbance caused by an overlay picture displayed on top of an actual program.

The TV or Video Signal 1510 can be provided via cable, satellite dish or network. Broadcasted TV programs may be received as well as video on demand.

In addition, the Processor Unit 1502 can be connected to a Network 1509 to obtain in particular information relating to actual television programs (e.g., via EPG) or other useful information to be provided/displayed to the user. Further, the network access can be utilized for obtaining TV and/or video programs and/or for storing audio and/or video information on the network. In this case, the Network 1509 may also be utilized as an external storage medium.

The Processor Unit 1502 may in particular access said Network 1509 via a wireless or via a wired interface.

FIG. 16 shows at least one timebar as displayed element in combination with a thumbnail bar (as described in connection with FIG. 8 above).

The timebar 1603 comprises an available timeshift buffer 1604 and a timeshift buffer 1605 that is currently filled with content, e.g., audio and/or video data. A state indicator 1606 visualizes the current status of operation ("pause" according to the example of FIG. 16). A time indicator 1607 with a vertical pointer line shows a current offset. A sub-timebar 1608 visualizing the filled portion of the total timebar 1603 grows to the left, wherein the right hand side of the timebar 1603 corresponds to the actual time 1609 ("Live Time").

A time mark 1601 is set and visualized within the sub-timebar 1608. There may be many such time marks, set upon user interaction and/or automatically, e.g., upon scene changes. This time mark 1601 is associated with a thumbnail 1602, i.e. in case a user accesses said time mark 1601 or said thumbnail 1602 s/he may obtain access to the audio and/or video data starting at the time of this time mark 1601.

The invention claimed is:

1. An apparatus for processing audio and/or video data, the apparatus operatively adapted for causing display of an element comprising at least one absolute time or at least one time indicator, wherein:
    a sector associated with the element indicates a duration or a length of the audio and/or video data;
    a total free space indicator of the element indicates total free space left on a storage medium;
    the total free space indicator has a shape of a portion of a circle or a portion of a ring;
    time marks are displayed that are set automatically or by user interaction;
    said time marks are at least partially associated with picture and/or audio information;
    the picture and/or audio information is at least temporarily displayed as thumbnails within a thumbnail bar;
    the element has a shape of a portion of an analogue clock; and
    sub-sectors of the sector present details of the audio and/or video data.

2. The apparatus according to claim 1, wherein:
    the picture and/or audio information is at least temporarily displayed.

3. The apparatus according to claim 1, wherein:
    said thumbnail bar provides a sequence of scene snapshot information or any other bookmark related visual and/or audio information.

4. The apparatus according to claim 1, said apparatus adapted to utilize thumbnail highlighting, wherein:
    at least one thumbnail is correlated to a particular time mark within the audio and/or video data.

5. The apparatus according to claim 1, wherein:
    the apparatus is operably adapted for allowing a user to adjust a time base at which time marks are automatically set.

6. The apparatus according to claim 1, wherein:
    a time mark is set upon detection of a scene change.

7. The apparatus according to claim 6, wherein:
    the element has a disc-like representation.

8. The apparatus according to claim 1, wherein:
    the element displayed comprises a timebar.

9. The apparatus according to claim 1, wherein:
    the element has a 2- or 3-dimensional shape.

10. The apparatus according to claim 1, wherein:
the element displayed shows an analogue clock.

11. The apparatus according to claim 1, wherein:
the sector or the portion is arranged inside the element.

12. The apparatus according to claim 1, wherein:
the sector or the portion indicates a length or a duration of a recording session and/or a length or a duration of stored program material.

13. The apparatus according to claim 1, wherein:
the apparatus comprises at least one storage medium for storing the audio and/or video data.

14. The apparatus according to claim 1, wherein:
the apparatus is operatively adapted for causing display of at least one pointer that points to a position within the sector.

15. The apparatus according to claim 1, wherein:
at least one time indicator is displayed, said time indicator in particular providing visual time information in a numerical format in conjunction with at least one line pointer.

16. The apparatus according to claim 1, wherein:
at least one iconic state indicator is adapted to display trick play mode information comprising each of the following:
  playback,
  record,
  pause,
  slow/fast play,
  fast forward speed,
  slow reverse,
  fast reverse speed.

17. The apparatus according to claim 1, wherein:
a cache sector and/or a cache portion is displayed representing a recorded time interval of a program.

18. The apparatus according to claim 17, wherein:
the sub-sectors of the sector present details of the cache sector contents and attribute information of the audio and/or video data are provided by a zoom functionality, whereby a portion of the analogue clock is exploded.

19. The apparatus according to claim 18, wherein:
the zoom functionality is provided on request of a user.

20. The apparatus according to claim 17, wherein:
the program recorded is stored to a logically assigned cache buffer that is preferably distinguishable from further cache sectors due to attribute information.

21. The apparatus according to claim 20, wherein:
said attribute information comprises at least one of the following:
  age rating level;
  program channel;
  source information;
  other EPG information;
  user defined information;
  automatically generated bookmark information.

22. The apparatus according to claim 1, wherein:
the apparatus is operatively adapted for causing display of recording and play back relevant device resources.

23. The apparatus according to claim 22, wherein:
the apparatus is operatively adapted for providing information on available free storage resources.

24. The apparatus according to claim 22, wherein:
the apparatus is operatively adapted for providing an absolute rest of free storage medium or the free storage medium in proportion to the complete storage medium size.

25. The apparatus according to claim 1, wherein:
the apparatus is operatively adapted for providing interfaces and functionality of a Set Top Box connected to a TV to provide access to program material via satellite, cable network or IP network.

26. The apparatus according to claim 1, wherein:
the apparatus is operatively adapted for providing interfaces and functionality of a TV set providing access to program material via satellite, cable network or IP network.

27. The apparatus according to claim 1, wherein:
the apparatus is operatively adapted for causing display of a second sector associated with the element, said second sector indicating a duration of simultaneous audio and/or video data, and said element adapted to render more than one sector simultaneously over an interval of time.

28. The apparatus according to claim 1, wherein:
the apparatus is operatively adapted for causing display of:
  a second sector associated with the element, said second sector indicating a duration of simultaneous audio and/or video data, said element adapted to render more than one sector simultaneously over an interval of time; and
  at least one pointer that points to a position within the sector and also points to a position within the second sector.

29. The apparatus according to claim 1, wherein:
the apparatus is operatively adapted for causing display of:
  a second sector associated with the element, said second sector indicating a duration of simultaneous audio and/or video data, said element adapted to render more than one sector simultaneously over an interval of time;
  a first pointer that points to a position within the sector; and
  a second pointer that points to a position within the second sector.

30. A method for processing audio and/or video data comprising:
displaying an element comprising at least one absolute time or at least one time indicator, wherein:
  a sector or a portion of said element is associated with a duration or a length of the audio and/or video data;
  a total free space indicator of the element indicates total free space left on a storage medium;
  the total free space indicator has a shape of a portion of a circle or a portion of a ring;
  time marks are displayed that are set automatically or by user interaction;
  said time marks are at least partially associated with picture and/or audio Information;
  the picture and/or audio information is at least temporarily displayed as thumbnails within a thumbnail bar;
  the element displayed has a shape of at least a portion of an analogue clock; and
  sub-sectors of the sector present details of the audio and/or video data.

31. The method according to claim 30, wherein:
said audio and/or video data is analyzed and upon detection of a scene change a time mark is automatically set.

* * * * *